(No Model.)

G. W. WORDEN.
CRATE.

No. 444,657. Patented Jan. 13, 1891.

Witnesses:
Emil Neuhart
Jacob Nusenblatt

George W. Worden Inventor:
By Wilhelm & Bonner
Attorneys.

UNITED STATES PATENT OFFICE.

GEORGE W. WORDEN, OF LEWISTON, NEW YORK.

CRATE.

SPECIFICATION forming part of Letters Patent No. 444,657, dated January 13, 1891.

Application filed May 29, 1890. Serial No. 353,555. (No model.)

*To all whom it may concern:*

Be it known that I, GEORGE W. WORDEN, a citizen of the United States, residing at Lewiston, in the county of Niagara and State of New York, have invented new and useful Improvements in Fruit-Crates, of which the following is a specification.

This invention relates to a crate which is especially desirable for carrying and shipping peaches and other delicate fruit in baskets.

The object of my invention is to avoid repeated handling of the baskets containing the fruit, which causes the fruit to be bruised or crushed and impairs its appearance, and to produce a light and rigid crate in which fruit is protected and the baskets reliably held against displacement.

Figure 1:
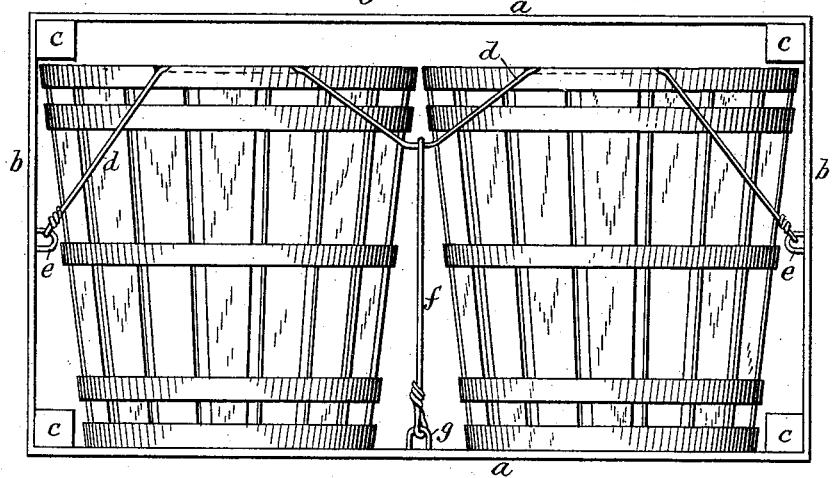
Figure 2:
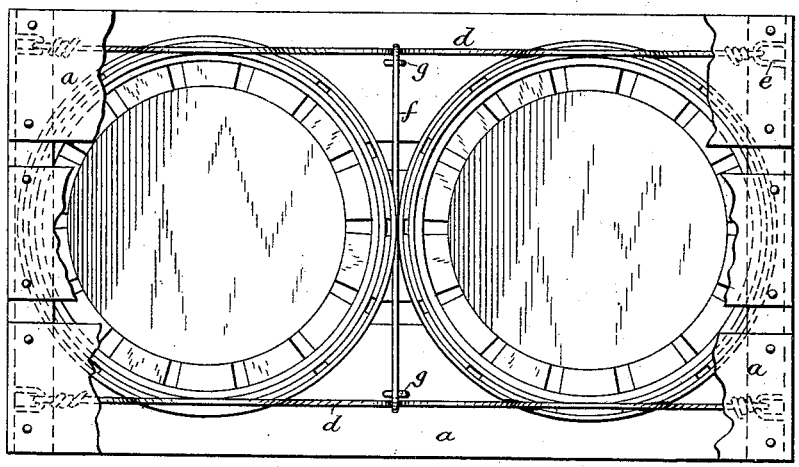

In the accompanying drawings, Figure 1 is a side elevation of my improved crate containing two peach-baskets. Fig. 2 is a top plan view thereof with part of its top broken away to expose the fastening devices.

Like letters of reference refer to like parts in both figures.

The crate consists of an open rectangular box or case constructed of horizontal slats $a$ $a$, forming the top and bottom, and vertical slats $b$ $b$, forming the end walls of the crate, the top and bottom slats and the end slats being secured to transverse corner-strips $c$. The two sides of the crate are open for the introduction of the fruit-baskets into the crate and for exposing the same to view.

$d$ $d$ represent longitudinal retaining wires or straps fastened at their ends to staples $e$, secured to the end walls of the crate and passing over the upper edges of the fruit-baskets on opposite sides of their center, so as to hold the baskets down upon the bottom of the crate, as well as prevent lateral displacement thereof. Opposite portions of the hoops at the upper ends of the fruit-baskets are preferably grooved, as shown, to form seats which hold the retaining-wires in place on the baskets.

$f$ represents a tightening-wire passing over the portions of the retaining-wires $d$ between the adjacent fruit-baskets and secured at its ends to staples $g$, fastened to the bottom of the crate. The longitudinal retaining-wires are drawn taut by the tightening-wire $f$, causing the same to firmly hold the baskets in place. By this arrangement of the fastening-wires the baskets are not only held against displacement, but the transverse tightening-wire acts as a brace or support, which sustains the bottom of the crate and prevents the same from sagging or becoming loose under the weight of the fruit when lifted from the ground. The weight or strain upon the bottom of the crate is thus transmitted through the tightening-wire and retaining-wires to the end walls of the crate, and is largely borne by the same, rendering the crate very strong and rigid, enabling the same to be made of light, thin slats, and dispensing with the use of partitions or other intermediate connecting parts for stiffening the crate.

In securing the baskets within the crate the retaining-wires are fastened to the staples at one end of the crate, passed over the baskets and fastened to the staples at the opposite end of the crate, and the tightening-wire is then fastened at one end to one of the bottom staples, tightly drawn over the retaining-wires and fastened with its free end to the other bottom staple. The ends of the several wires are readily secured to the staples by looping the same through the staples.

By the use of my improved crate all handling of the fruit-baskets in their transit from the orchard to the market is avoided, thus protecting the fruit and preserving its appearance. The crates, being of rectangular form and having no projecting parts, admit of being compactly piled in tiers without injuring the fruit and enable a larger number of baskets to be safely placed into a car than by the ordinary method of shipping without crates. The arrangement of two or more baskets in one crate also facilitates the handling of the fruit and involves a considerable saving in time and labor.

My improved crate is very cheaply manufactured, and the time consumed in crating the baskets is fully compensated by the saving of time in the subsequent handling of the fruit and the increased price commanded by the fruit, owing to its preservation and superior appearance.

I claim as my invention—

1. A fruit-crate consisting of a rectangular box having an open side and provided with a retaining-wire adapted to pass over two or more baskets, and a tightening-wire connecting said retaining-wire with the bottom of the crate between said baskets, substantially as set forth.

2. A fruit-crate consisting of a rectangular box having an open side and provided with retaining-wires passing over two or more baskets and attached to opposite ends of the crate, and a tightening-wire passing over the retaining-wires between said baskets and having its ends attached to the bottom of the crate, substantially as set forth.

3. A crate consisting of a rectangular box having its end walls and its bottom provided with staples, retaining-wires passing over the fruit-baskets and fastened at their ends to the staples of the end walls, and a tightening-wire passing over the portions of the retaining-wires between the adjacent baskets and fastened at its ends to the staples at the bottom of the crate, substantially as set forth.

Witness my hand this 22d day of May, 1890.

GEORGE W. WORDEN.

Witnesses:
JNO. J. BONNER,
FRED. C. GEYER.